(12) United States Patent
Trippett (10) Patent No.: US 11,713,257 B2
(45) Date of Patent: Aug. 1, 2023

(54) FLUID FILTRATION DEVICE

(71) Applicant: HydroCav, LLC, Beverly, MA (US)

(72) Inventor: David Trippett, Beverly, MA (US)

(73) Assignee: HydroCav, LLC, Newburyport, MA (US)

( * ) Notice: Subject to any disclaimer, the term of this patent is extended or adjusted under 35 U.S.C. 154(b) by 144 days.

(21) Appl. No.: 17/315,464

(22) Filed: May 10, 2021

(65) Prior Publication Data

US 2021/0261444 A1 Aug. 26, 2021

Related U.S. Application Data (63) Continuation of application No. PCT/US2020/062973, filed on Dec. 3, 2020.

(Continued)

(51) Int. Cl.
*C02F 1/34* (2023.01)
*C02F 1/50* (2023.01)
(Continued)

(52) U.S. Cl.
CPC .............. *C02F 1/34* (2013.01); *B01F 25/432* (2022.01); *C02F 1/001* (2013.01); *C02F 1/50* (2013.01);
(Continued)

(58) Field of Classification Search
CPC .... C02F 1/34; C02F 1/001; C02F 1/50; C02F 1/62; C02F 2101/20; C02F 2201/004; C02F 2301/024; C02F 2301/046; C02F 2301/08; C02F 2303/04; C02F 1/004; C02F 1/505; B01F 25/4338; B01F 25/4521; B01F 33/811; B01F 25/432; B01F 25/4321; B01F 25/4323; B01F 25/433; B01F 25/4334; B01F 25/4523; B01F 33/81; B01F 33/836; B01D 21/26; B01D 21/265; B01D 29/0004; B01D 29/0045; B01D 29/0047;
(Continued)

(56) References Cited

U.S. PATENT DOCUMENTS 2,178,411 A * 10/1939 Tietz ...................... F24C 3/008
312/107
2,575,995 A * 11/1951 Briggs ................... B01D 29/46
210/442
(Continued)

FOREIGN PATENT DOCUMENTS

| CN | 201643998 U | 11/2010 | |
| FR | 2637582 A1 * | 4/1990 | ............... C02F 1/34 |
| JP | 2018-134588 A | 8/2018 | |

OTHER PUBLICATIONS

Translated abstract of Publication: FR2637582, Moisan, Published Apr. 13, 1990 (Year: 1990).*

(Continued)

*Primary Examiner* — Joseph W Drodge
(74) *Attorney, Agent, or Firm* — Daniel Akira Tesler (57) ABSTRACT

Described are filtration elements for removing materials from a fluid. The filtration elements generally operate by inducing cavitation into a fluid passing through them, generating energy and removing unwanted materials from the fluid. The filtration elements can be used singularly or in combination with one another for a multiple level filtration system.

16 Claims, 10 Drawing Sheets

Related U.S. Application Data (60) Provisional application No. 62/944,326, filed on Dec. 5, 2019.

(51) Int. Cl.
| | |
|---|---|
| *C02F 1/62* | (2023.01) |
| *B01F 25/43* | (2022.01) |
| *C02F 1/00* | (2023.01) |
| *B01F 25/432* | (2022.01) |
| *C02F 101/20* | (2006.01) |

(52) U.S. Cl.
CPC ............ *C02F 1/62* (2013.01); *C02F 2101/20* (2013.01); *C02F 2201/004* (2013.01); *C02F 2301/024* (2013.01); *C02F 2301/046* (2013.01); *C02F 2301/08* (2013.01); *C02F 2303/04* (2013.01)

(58) Field of Classification Search
CPC ............ B01D 29/0052; B01D 29/0059; B01D 29/0095; B01D 29/01; B01D 29/03; B01D 29/05; B01D 29/46; B01D 29/50; B01D 29/56; B01D 29/58; B01D 46/0012; B01D 2201/18; B01D 2201/182; B01D 2201/184; B01D 2201/188; B01D 2201/307; B01D 2201/44; B01D 2201/60
See application file for complete search history.

(56) References Cited

U.S. PATENT DOCUMENTS

| | | | | |
|---|---|---|---|---|
| 3,334,750 | A * | 8/1967 | Ullman, Jr. ............ | B01D 29/46 210/336 |
| 4,954,251 | A * | 9/1990 | Barnes ................... | B01D 29/58 210/489 |
| 4,991,241 | A * | 2/1991 | Bergmann ................ | E03C 1/04 4/677 |
| 5,492,654 | A * | 2/1996 | Kozjuk ................. | B01F 25/431 261/76 |
| 5,937,906 | A * | 8/1999 | Kozyuk ............... | B01F 25/4521 138/40 |
| 5,976,388 | A * | 11/1999 | Carson ................. | A61M 1/3696 494/67 |
| 6,318,564 | B1 * | 11/2001 | Archibald ............. | B01D 29/35 210/497.3 |
| 6,935,770 | B2 * | 8/2005 | Schueler ............. | B01F 25/4335 366/176.2 |
| 7,419,592 | B2 * | 9/2008 | Middler ................ | B01D 29/66 425/197 |
| 7,708,453 | B2 * | 5/2010 | Kozyuk ............... | B01F 25/4413 366/337 |
| 7,762,715 | B2 * | 7/2010 | Gordon ............... | B01F 25/4335 138/40 |
| 7,951,292 | B1 * | 5/2011 | De La Torre .......... | E03C 1/264 210/336 |
| 8,002,971 | B2 * | 8/2011 | Kozyuk ................ | C10G 27/04 138/140 |
| 9,290,717 | B1 * | 3/2016 | Kozyuk .................... | C11B 3/16 |
| 9,556,577 | B2 * | 1/2017 | Vaz Viegas ............ | C02F 1/001 |
| 2002/0043493 | A1 * | 4/2002 | Patil ................... | B01D 39/1692 210/490 |
| 2003/0213059 | A1 * | 11/2003 | Mattson, Jr. .......... | B01D 29/03 4/541.1 |
| 2010/0290307 | A1 * | 11/2010 | Gordon ............... | B01F 25/4521 366/104 |
| 2011/0220586 | A1 * | 9/2011 | Levitt ................... | B01D 29/23 210/791 |
| 2011/0284478 | A1 | 11/2011 | Lecoffre | |
| 2015/0321161 | A1 * | 11/2015 | Oklejas, Jr. ............. | B01F 25/25 366/163.2 |
| 2017/0008779 | A1 * | 1/2017 | Profit .................... | C02F 1/4672 |
| 2017/0128859 | A1 * | 5/2017 | Levitt .................... | B01D 29/05 |
| 2018/0280839 | A1 * | 10/2018 | Davis .................... | B01D 29/05 |
| 2019/0276332 | A1 | 9/2019 | Voecks | |

OTHER PUBLICATIONS

International Search Report and Written Opinion of the International Searching Authority, dated Feb. 17, 2021, in related case PCT/US20/62973, 9 pages.

\* cited by examiner

FLUID FILTRATION DEVICE

CROSS REFERENCE TO RELATED APPLICATIONS

This application is a continuation application of Patent Cooperation Treaty Application No. PCT/US20/62973 filed Dec. 3, 2020, which claims the benefit of U.S. Provisional Patent Application No. 62/944,326 filed Dec. 5, 2019, which are hereby incorporated by reference in their entirety.

FIELD

The present disclosure relates to fluid filtration devices, specifically to a minimal pressure drop device that removes heavy metals and bacteria from fluids.

BACKGROUND

Fluids, particularly water, can contain contaminants that are undesirable. Filters can remove particulates from fluids, but they are not very effective at removing dissolved or bacterial contamination from fluids. Filters also fill up with particulate matter quickly, causing a large pressure drop across the filter element, causing problems and inefficiencies with the circulation system associated with the fluid.

BRIEF SUMMARY

The present disclosure includes multiple filtration elements that can be used singularly or connected to one another to remove contaminants from fluids as that fluid passes through the filtration elements. Relevant drawings are included with this disclosure.

DETAILED DESCRIPTION

The present disclosure relates to multiple filtration elements that can be used to remove contaminants from a fluid. The filtration elements disclosed herein can be used singularly or in a system of multiple similar or different filtration elements.

Figure 1:
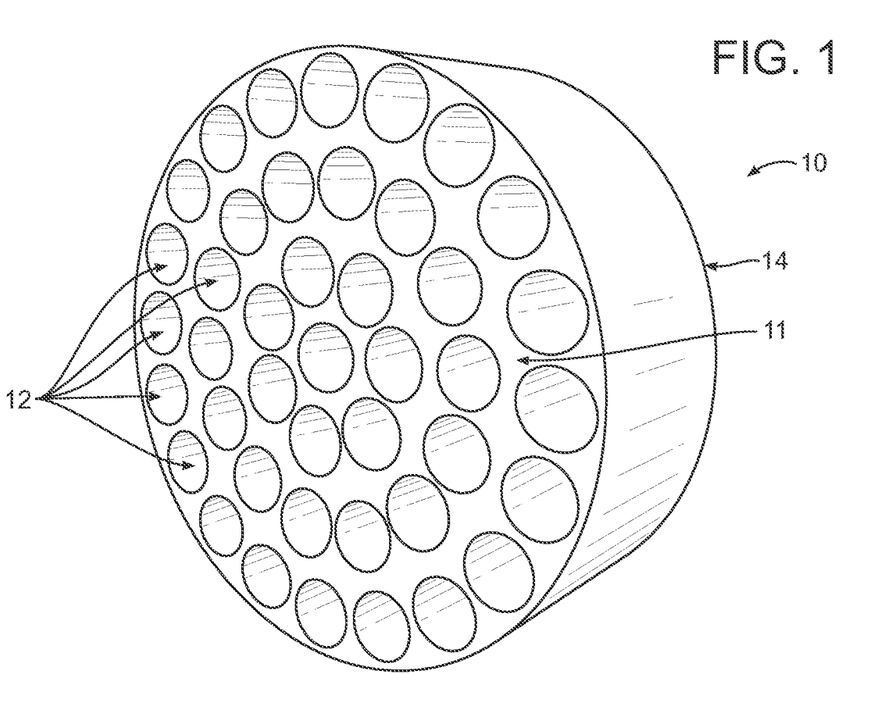
FIG. 1 is a perspective view of a first example embodiment of a filtration element, showing the fluid in-flow openings.

In FIG. 1 is a perspective view of a first example embodiment of a filtration element 10. The term "filtration element," as used herein, refers to any component that is capable of removing any dispersed and/or dissolved material from a fluid. A dispersed and/or dissolved material in a fluid is any element contained within a fluid that is different from the fluid itself. In some embodiments, a dispersed and/or dissolved material can be a contaminant, or some other undesirable element contained and/or suspended in the fluid.

The filtration element 10 in FIG. 1 comprises a face 11 and a plurality of in-flow openings 12 configured to allow a fluid to enter. In some embodiments, the face 11 is substantially flat. In some embodiments, the face 11 is positioned substantially perpendicular to the flow of a fluid. The term "substantially," as used herein, refers to any value within plus or minus 15%. For example, a surface would be substantially flat even it if contained alternating slopes of 15 degrees. For example, a surface would be substantially perpendicular to the flow of a fluid if it was positioned anywhere from 75 to 105 degrees from the direction of the flow of the fluid.

Figure 2:
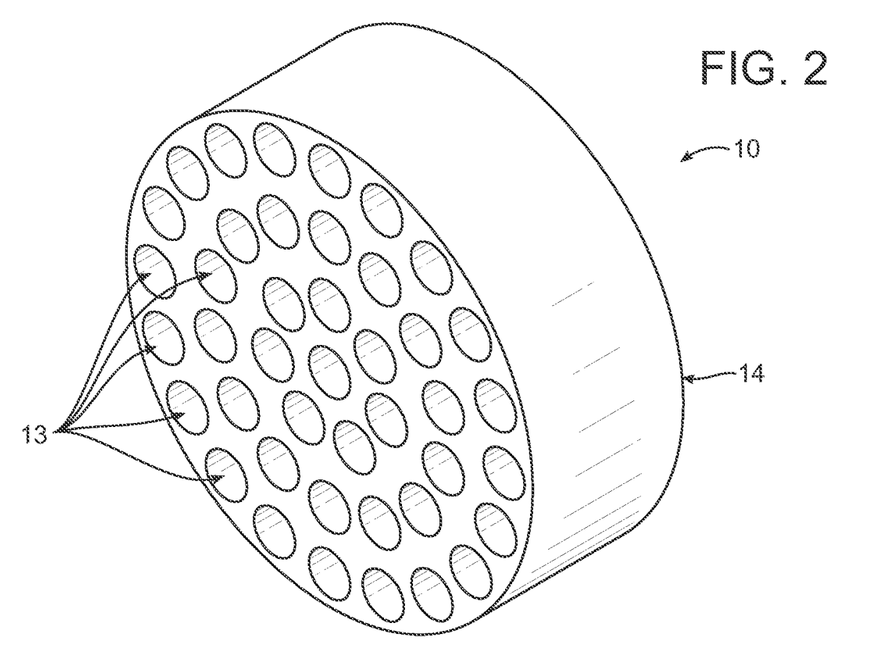
FIG. 2 is a perspective view of the first example embodiment of the filtration element, showing the fluid out-flow openings.
Figure 3:
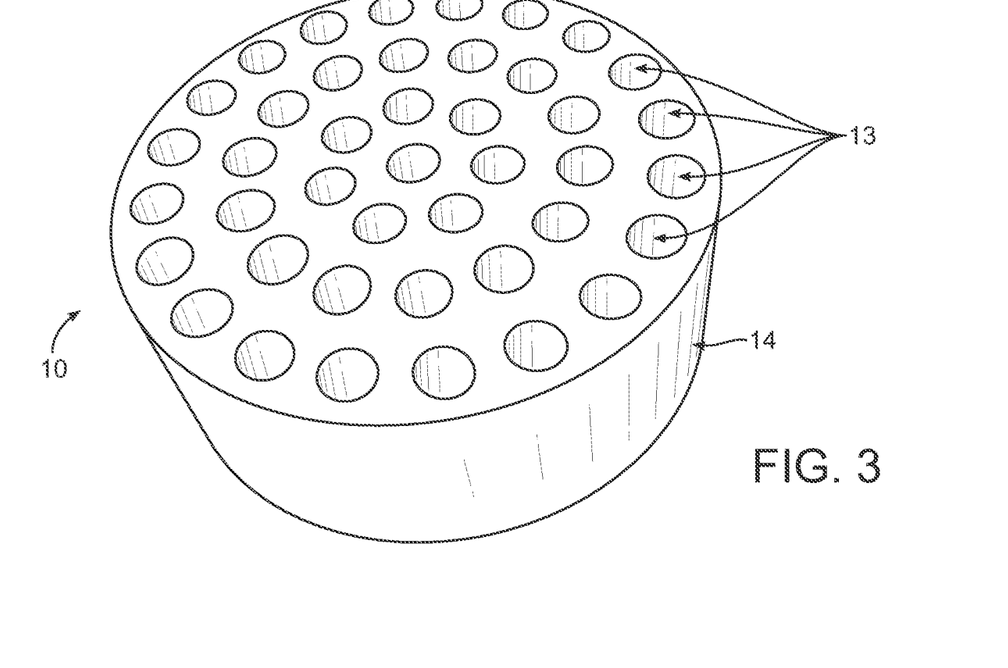
FIG. 3 is an alternate perspective view of the first example embodiment of the filtration element, showing the fluid out-flow openings.

In FIG. 2 is a perspective view of the filtration element 10, showing the fluid out-flow openings 13. In some embodiments, the diameter of the fluid out-flow openings 13 are less than the diameter of the fluid in-flow openings 12. FIG. 3 is an alternate perspective view of the filtration element 10, also showing the fluid out-flow openings 13.

Figure 4:
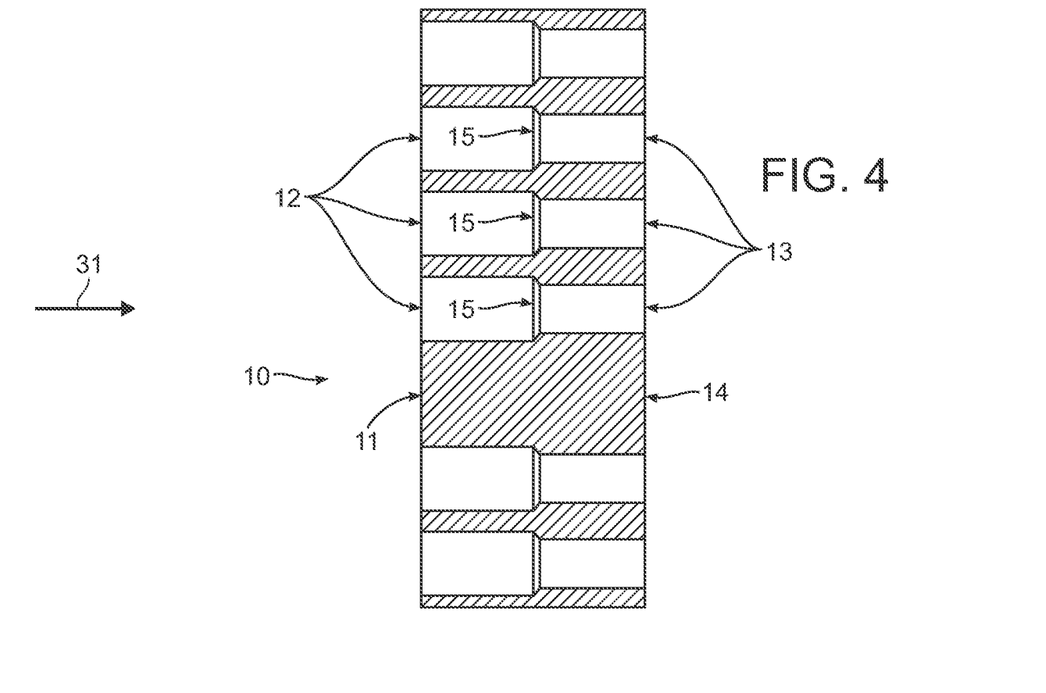
FIG. 4 is a side sectioned view of the first example embodiment of the filtration element, showing a cross section of the fluid flow openings and the direction of a flow of fluid.

In FIG. 4 is a side sectioned view of the filtration element 10, showing the progression of the fluid in-flow openings 12 through the body 14 and their connection to the fluid out-flow openings 13. Arrow 31 represents the direction of flow of a fluid relative to the filtration element 10. In some embodiments, the fluid in-flow openings 12 are a first diameter and the fluid out-flow openings 13 are a second diameter, where the second diameter is less than the first diameter, leaving a step 15 in the bore at the transition point between the fluid in-flow opening 12 and the fluid out-flow opening 13.

In some embodiments, the fluid in-flow openings 12 and fluid out-flow openings 13 comprise a cylindrical opening connected to one another and extending from the face 11 through the entirety of the body 14. In some embodiments, the diameter of the fluid in-flow openings 12 is about 1 to 3 times the diameter of the fluid out-flow openings 13. In some embodiments, the diameter of the fluid in-flow openings 12 is preferably about 1.5 to 2.5 times the diameter of the fluid out-flow openings 13. When the diameter of the fluid in-flow openings 12 are manufactured in the preferred range relative to the diameter of the fluid out-flow openings 13, the unexpected results of increased turbulence and cavitation was observed without undue restriction to the flow of the fluid.

The number of fluid in-flow openings 12 and fluid out-flow openings 13 is generally a function of the size or diameter of the openings 12 and 13 and the size of the body 14. In some embodiments, the filtration element 10 is manufactured by starting with a cylindrically shaped body 14 and drilling openings 12 and 13 along the axial center of the body 14. After the first opening 12 and 13 is made along the axial center of the body 14, additional openings 12 and 13 are made substantially parallel to the first opening 12 and 13, moving outward from the axial center of the body 14, towards its edge. In some embodiments, the openings 12 and 13 are manufactured symmetrically and so that no opening 12 and 13 overhangs an outer edge of the body 14. For example, a filtration element 10 with a cylindrical body 14 having a diameter of about 2 inches, could have about 42 openings 12 and 13 using the method of manufacturing disclosed herein.

The filtration element 10 acts as a filtration element by inducing a highly efficient hydrodynamic cavitation process. When a fluid passes across the filtration element 10, the filtration element 10 causes cavitation, which is the formation and collapse of bubbles in a fluid. A "bubble," as used herein, refers to any void within a fluid. A void within a fluid can be empty or filled with any material or element that is not the fluid itself. The turbulence generated by the cavitation generates large amounts of energy capable of removing dispersed and/or dissolved materials from a fluid.

Multiple components of the filtration element 10 are capable of inducing turbulence and/or cavitation into a fluid. In some embodiments, the face 11, being substantially perpendicular to the flow of the fluid, causes significant turbulence and cavitation in the fluid flow. In some embodiments, fluid that enters the fluid in-flow openings 12 is constricted by the step 15 before exiting through the out-flow openings 13, causing additional turbulence and cavitation. In some embodiments, the diameter of the fluid in-flow openings 12 is substantially the same as the diameter of the out-flow openings 13. As noted earlier, the turbulence and cavitation induced by the filtration element 10 generates a large amount of energy that removes dispersed and/or dissolved materials from a fluid.

Figure 5:
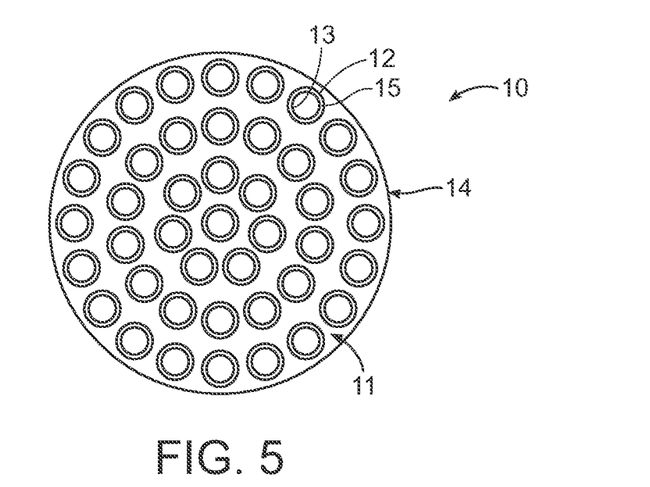
FIG. 5 is a front view of the first example embodiment of the filtration element, showing the fluid in-flow openings.
Figure 6:
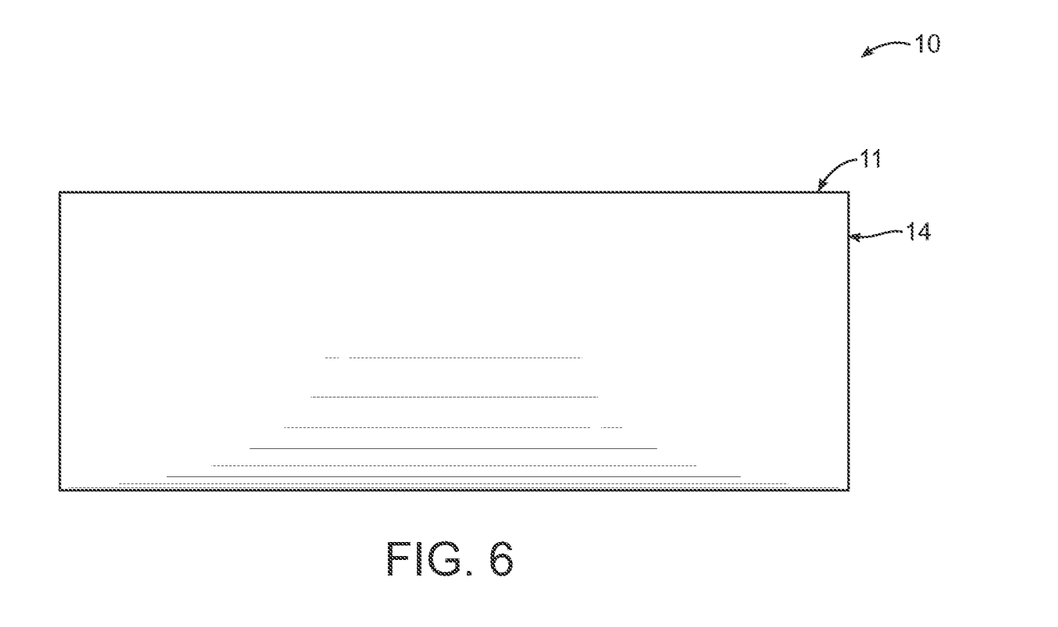
FIG. 6 is a side view of the first example embodiment of the filtration element.

In FIG. 5 is a front view of the filtration element 10 showing the fluid in-flow openings 12 that pass through the face 11 and body 14. The fluid in-flow openings 12 transition to a step 15 and then to the fluid out-flow openings 13. In FIG. 6 is a side view of the filtration element 10 showing the overall shape of the body 14. The term "front," as used herein, is only used for ease of explanation in reference to the drawings and is not intended to limit the disclosure. The term "front" can refer to the portion of the filtration element 10 that faces the flow of a fluid or in other words is facing opposite the direction of flow.

A prototype version of the filtration element 10 was tested on water and it was discovered that the filtration element 10 removes heavy metals, *Legionella* and *E. coli*. Table 1 comprises a compilation of testing data completed on water that cycled through a filtration element zero times (untreated), 4 times, 40 times and 80 times, showing the effectiveness of the filtration element 10 at removing the tested materials from a fluid. *Legionella* has a similar structure and make-up as *E. coli*, making the test results for *E. coli* in water an effective proxy for showing the effectiveness of the filtration element 10 at removing *Legionella* from water.

TABLE 1

Table of water testing completed using prototype versions of filtration elements disclosed herein:

| Cycles | Iron (mg/L) | Lead (mg/L) | Copper (mg/L) | Manganese (mg/L) | *E. coli*, Colilert, MPN (per 100 ml) |
|---|---|---|---|---|---|
| 0 | 6.76 | 0.018 | 0.4 | 1.52 | >2,420 |
| 4 | 1.99 | 0.002 | 0.04 | 0.12 | |
| 40 | 0.36 | ND | ND | 0.01 | |
| 80 | | | | | 1 |

Figure 7:
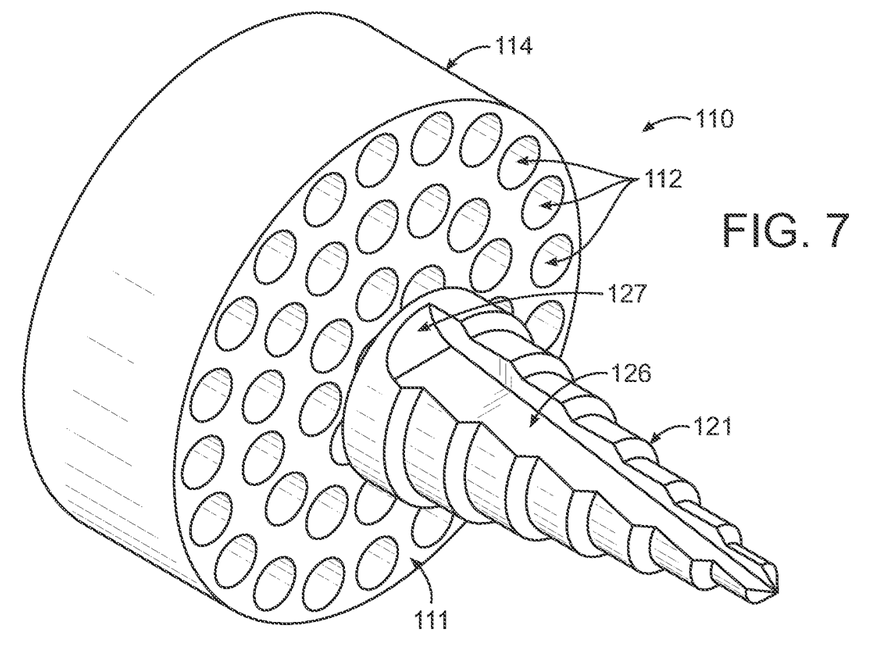
FIG. 7 is a perspective view of a second example embodiment of the filtration element, showing the fluid in-flow openings.

Cycles = Number of times the water had passed through the filtration element prior to being tested for the listed contaminants.
ND = Not Detected. If the analyte is present, the concentration is below the detection limit.
Lead Detection Limit = 0.001 mg/L
Iron Detection Limit = 0.04 mg/L
Copper Detection Limit = 0.02 mg/L
Manganese Detection Limit = 0.01 mg/L
*E. coli*, Colilert, MPN Detection Limit = 1 per 100 ml In FIG. 7 is a perspective view of a second example embodiment of the filtration element 110. The elements in the alternative embodiment which are substantially the same as the corresponding elements of the first embodiment described are identified with the same numeral. Elements which are similar (but not necessarily identical) in function are denoted by the same numeral plus 100.

The filtration element 110 can comprise a face 111 and a plurality of in-flow openings 112 configured to allow a fluid to enter. In some embodiments, the face 111 is substantially flat. In some embodiments, the face 111 is positioned substantially perpendicular to the flow of a fluid.

Figure 8:
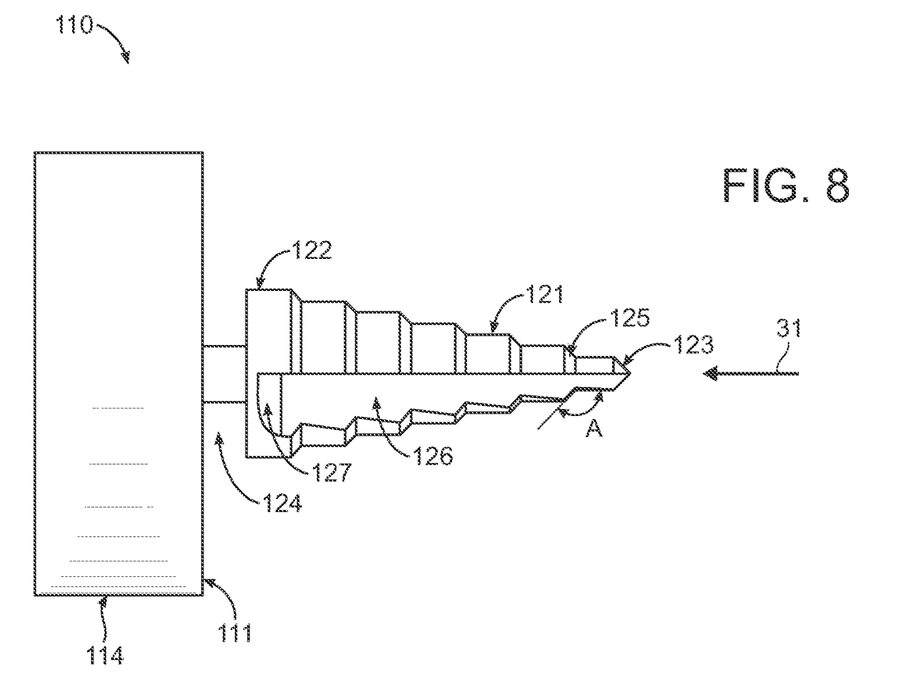
FIG. 8 is a side view of the second example embodiment of the filtration element.

The filtration element 110 can further comprise a conical element 121 configured, in some embodiments, to induce additional turbulence and/or cavitation. The conical element 121 is preferably fixed to the face 111 so that the wide end 122 is positioned closer to the face 111 than the narrow end 123. The wide end 122 of the conical element 121 is preferably spaced away from the face 111 with a gap 124 so that none of the in-flow openings 112 are blocked. In some embodiments, the gap 124 is about 0.2 to 2.0 times the diameter of the in-flow openings 112. In some embodiments, the conical element 121 comprises stepped features 125 with an angle A relative to the direction of fluid flow 31. In some embodiments, angle A is between about 120 to 160 degrees relative to the direction of fluid flow 31. In some embodiments, angle A is preferably between about 126 to 144 degrees relative to the direction of fluid flow 31. In some embodiments, angle A is preferably an angle relative to the direction of fluid flow 31 capable of inducing hydrodynamic cavitation in the fluid. Some embodiments of the conical element 121 comprise a cut-out 126 in the direction of fluid flow 31 with a kick-out 127 near the wide end 122, where the kick-out 127 is in a direction away from the axial center of the conical element 121. Some embodiments may include a plurality of cut-outs 126 and kick-outs 127, as needed, to induce additional turbulence and/or cavitation in the fluid. In some embodiments, the conical element 121 does not include any cut-outs 126 or kick-outs 127.

Figure 9:
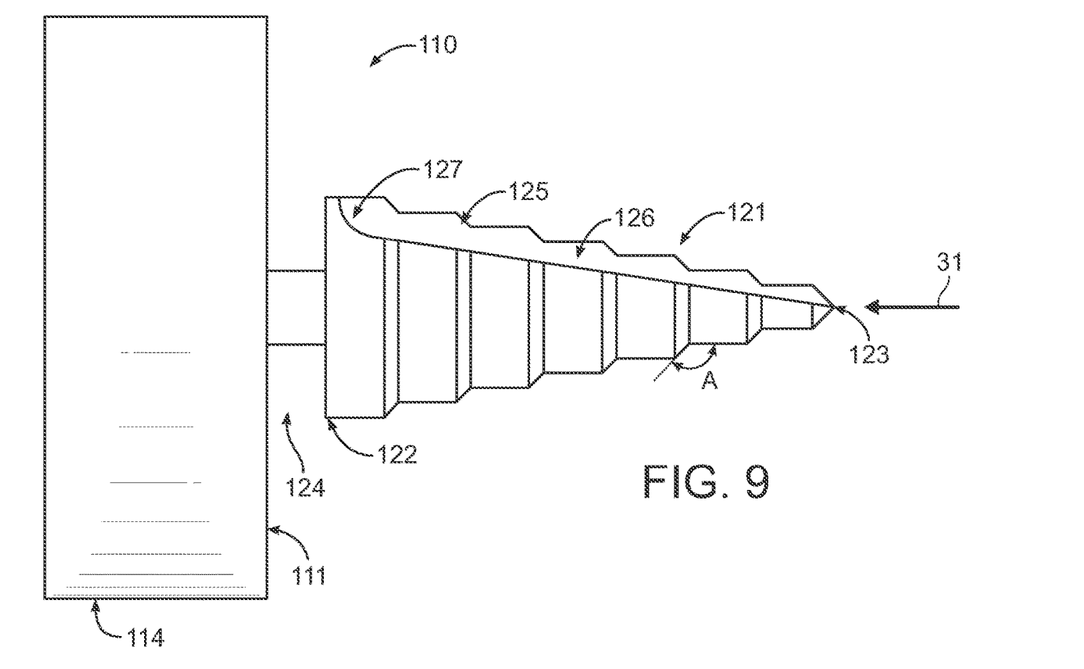
FIG. 9 is an alternate side view of the second example embodiment of the filtration element.
Figure 10:
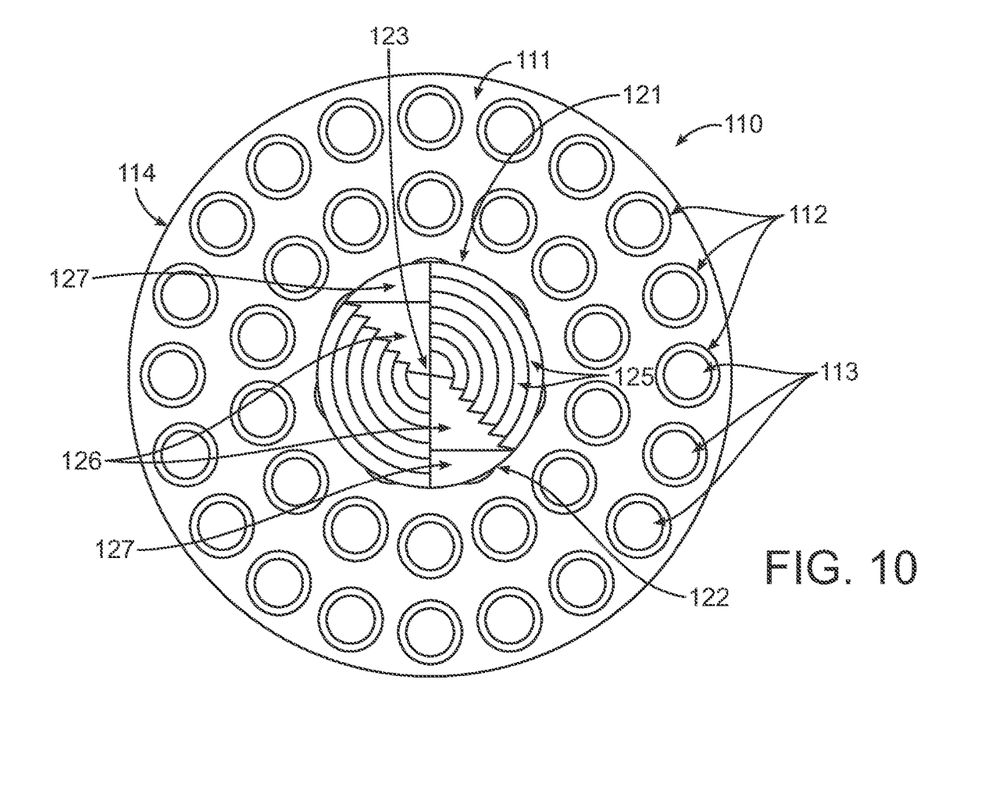
FIG. 10 is a front view of the second example embodiment of the filtration element, showing the fluid in-flow openings.
Figure 11:
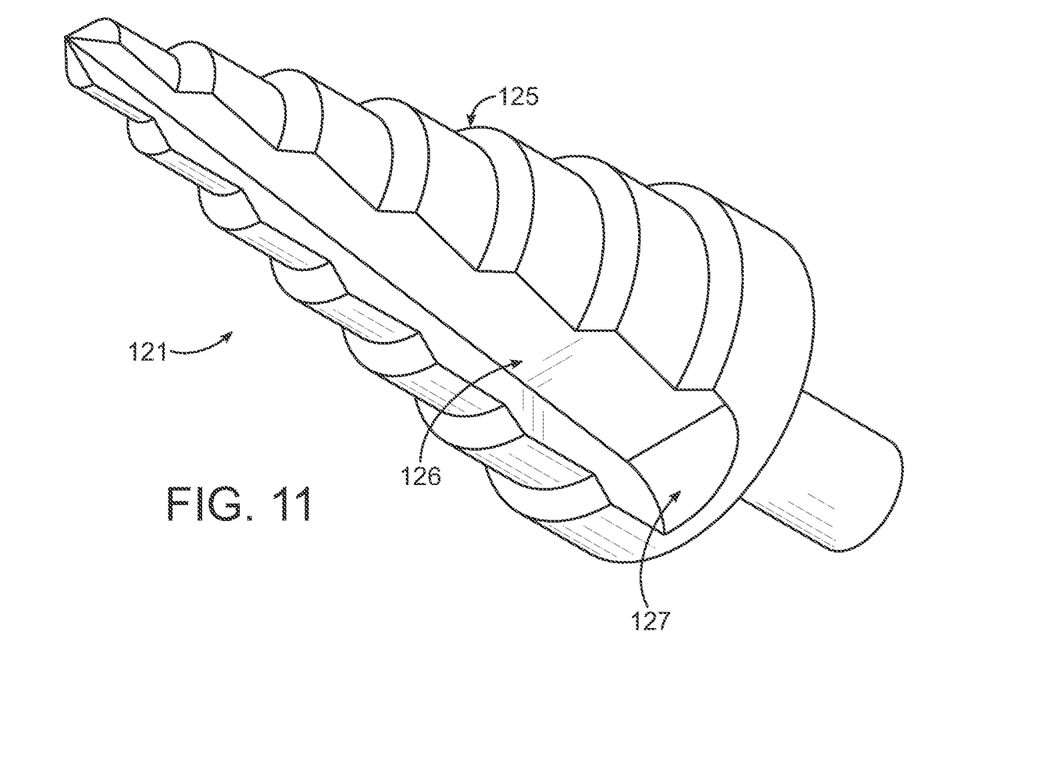
FIG. 11 is a perspective view of a conical element that comprises a portion of the second example embodiment of the filtration element.

In FIG. 9 is an alternate side view of the filtration element 110 showing the conical element 121 mounted to the body 114. In FIG. 10 is a front view of the filtration element 110, showing the fluid in-flow openings 112 and a conical element 121 comprising a plurality of cut-outs 126 and kick-outs 127. FIG. 11 is a perspective view of a conical element 121 separated from the filtration element 110, showing the cut-out 126, kick-out 127 and stepped features 125.

Figure 12:
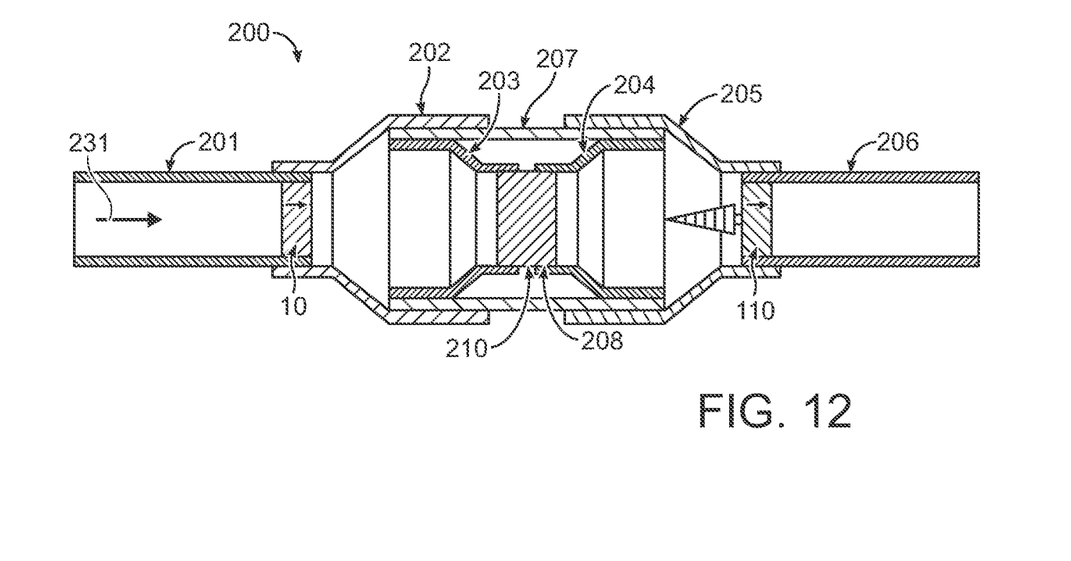
FIG. 12 is a side sectioned view of a fluid filtration system comprising at least the first example embodiment of the filtration element and the second example embodiment of the filtration element mounted in a housing defining a flow path.

In FIG. 12 is a side sectioned view of an example embodiment of a fluid filtration system 200 comprising a plurality of filtration elements. The system 200 can comprise an inlet pipe 201 configured to direct a flow path 231 into a first filtration element 10. A "flow path," as used herein, refers to any boundary (whether a physical boundary or not) that defines a path that a fluid could pass along. In some embodiments, the flow path 231 comprises a circular cross section with a diameter. Fixed to the inlet pipe 201 can be a first reducer coupler fitting 202 used to increase the diameter of the flow path. Fixed to the fitting 202 can be a second reducer coupler fitting 203 used to decrease the diameter of the flow path. Fixed to the fitting 203 can be a third reducer coupler fitting 204 used to increase the diameter of the flow path. In some embodiments, an exterior pipe 207 can be fixed between the exterior of the second fitting 203 and the third fitting 204 to provide a smoother outer surface and to increase the structural integrity of the system 200. Fixed to the fitting 204 can be a fourth reducer coupler fitting 205 used to decrease the diameter of the flow path. Fixed to fitting 205 can be outlet pipe 206, used to direct the flow of a fluid away from a second filtration element 110. A "reducer coupler," as used herein, refers to any element in a flow path that changes the cross-sectional area of the flow path, whether increasing or decreasing the cross-sectional area. In some embodiments, the diameter of the flow path in the inlet pipe 201 is substantially the same as the diameter of the flow path in the outlet pipe 206.

The area 208 of reduced cross-sectional area between the second fitting 203 and the third fitting 204 can generate additional turbulence and/or hydrodynamic cavitation through a venturi effect when the flow path 231 pushes a fluid through the area 208. In some embodiments, the area 208 further comprises a filtration element 210. The filtration element 210 can be substantially similar to the filtration element 10 or the filtration element 110 in some embodiments. The filtration element 210 is preferably adapted for the particular cross-sectional area of the second fitting 203, third fitting 204 and the volume of fluid passing through the flow path 231. The filtration element 210 can comprise openings sized and manufactured according to the disclosure herein. The size of any openings in the filtration element 210 can also be determined based on the viscosity and flow rate of the intended fluid passing through the flow path 231. In some embodiments, the size of any openings in the filtration element 210 can also be determined based on the size or diameter of the body of the filtration element 210. For example, a larger diameter body generally requires larger openings and a smaller diameter body generally requires smaller openings.

The pipes and couplers 201, 202, 203, 204, 205, 206, 207, 208 and 210 can comprise one of polyvinyl chloride (PVC), Copper and Stainless Steel.

Figure 13:
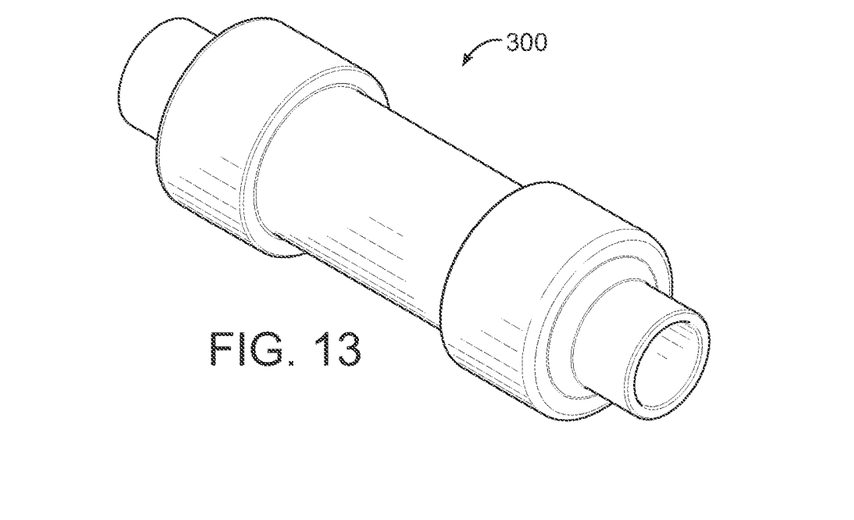
FIG. 13 is a perspective view of an alternative fluid filtration system comprising at least the first example embodiment of the filtration of the filtration element and the second example embodiment of the filtration element mounted in a housing defining a flow path.
Figure 14:
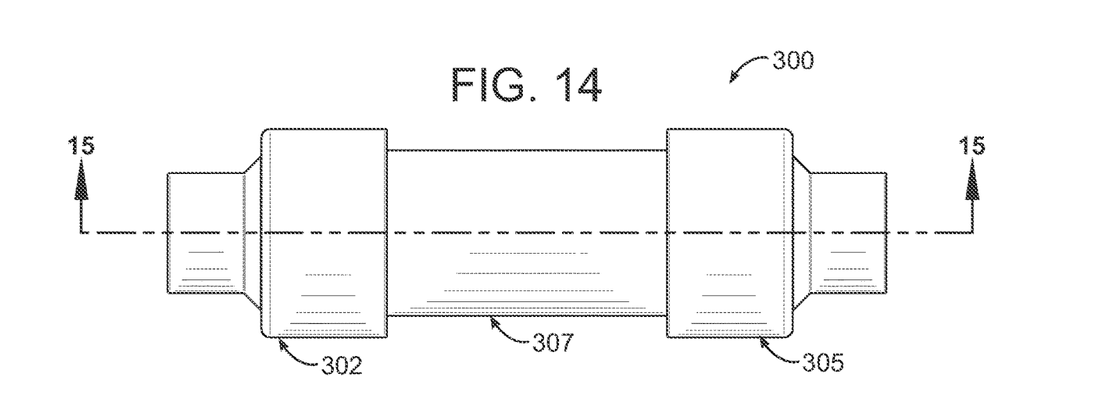
FIG. 14 is a side view of an alternative fluid filtration system comprising at least the first example embodiment of the filtration of the filtration element and the second example embodiment of the filtration element mounted in a housing defining a flow path.

In FIG. 13 is a perspective view of an alternative example embodiment of a fluid filtration system 300 comprising a plurality of filtration elements. In FIG. 14 is a side view of the fluid filtration system 300 identifying section line 15-15 used in FIG. 15.

Figure 15:
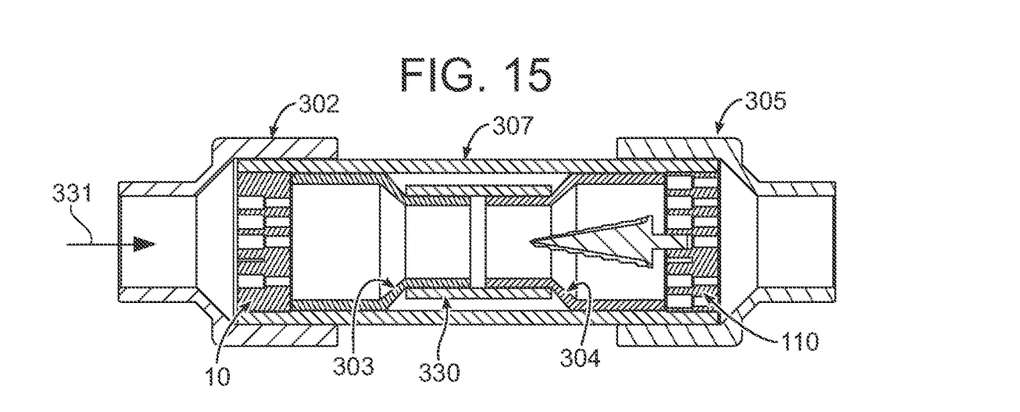
FIG. 15 is a side sectioned view of an alternative fluid filtration system, cut along line 15-15 identified in FIG. 14, comprising at least the first example embodiment of the filtration of the filtration element and the second example embodiment of the filtration element mounted in a housing defining a flow path.
Figure 16A:
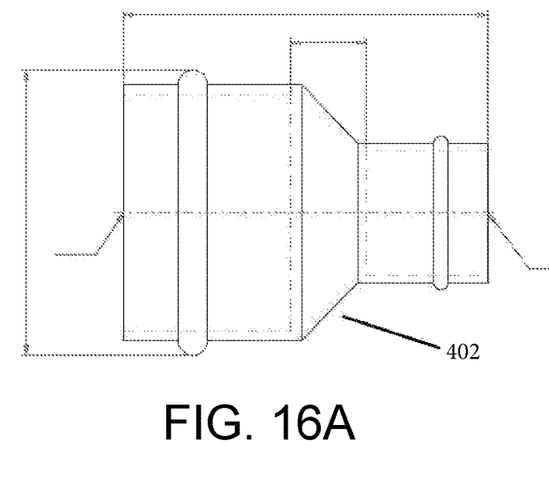
FIG. 16A is a side view of an alternative configuration of element 302 in FIG. 15.
Figure 16B:
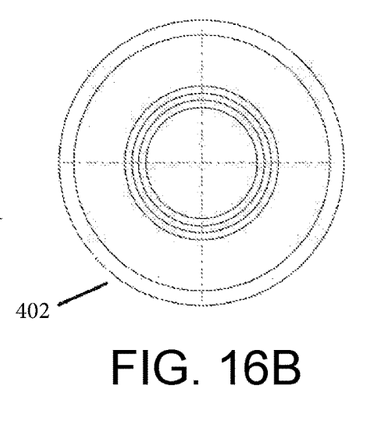
FIG. 16B is a rear view of the alternative configuration of element 302 in FIG. 15.
Figure 17A:
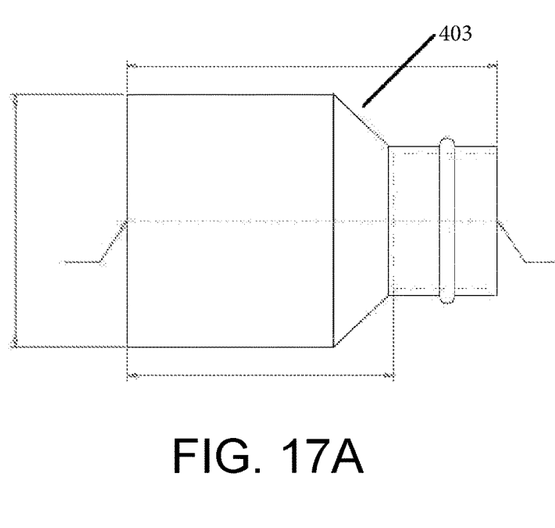
FIG. 17A is a side view of an alternative configuration of element 303 in FIG. 15.
Figure 17B:
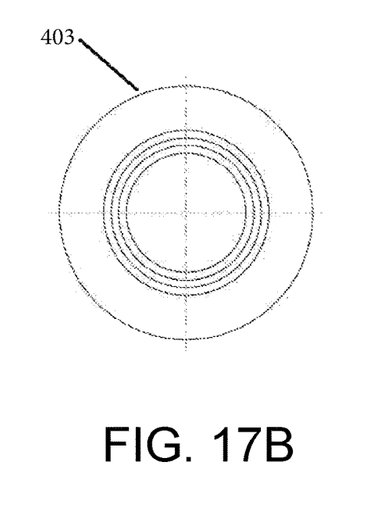
FIG. 17B is a rear view of the alternative configuration of element 303 in FIG. 15.
Figure 18A:
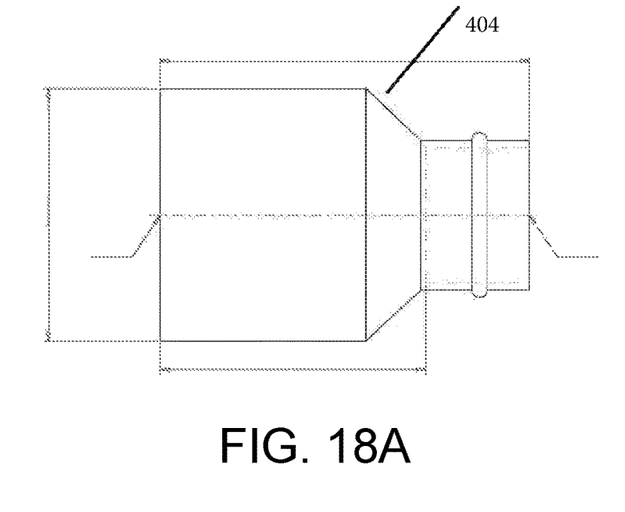
FIG. 18A is a side view of an alternative configuration of element 304 in FIG. 15.
Figure 18B:
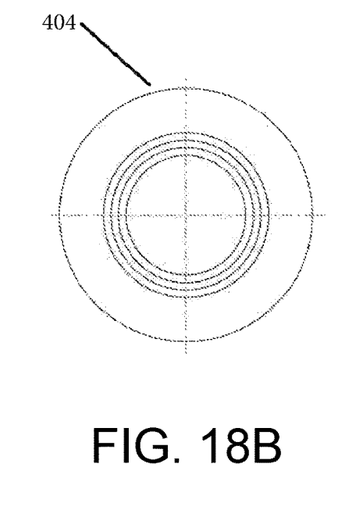
FIG. 18B is a rear view of the alternative configuration of element 304 in FIG. 15.
Figure 19A:
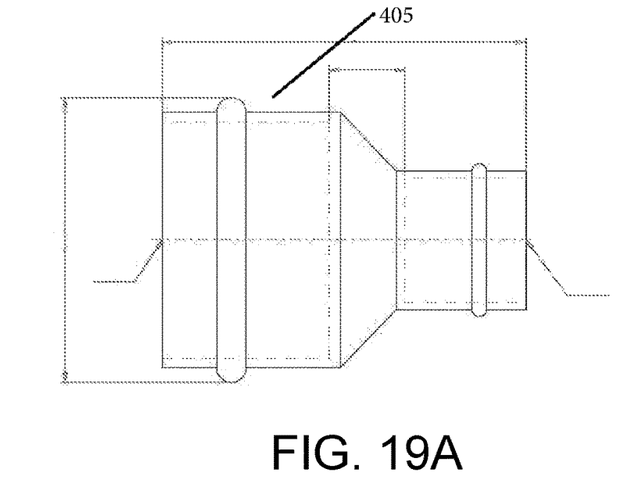
FIG. 19A is a side view of an alternative configuration of element 305 in FIG. 15.
Figure 19B:
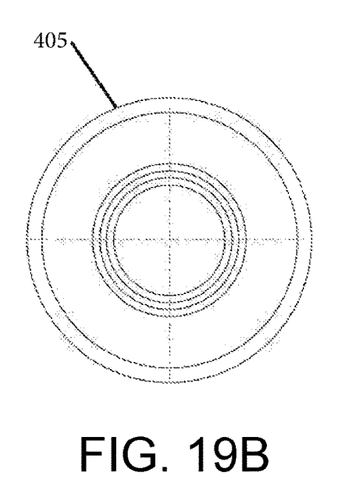
FIG. 19B is a rear view of the alternative configuration of element 305 in FIG. 15.
Figure 20:
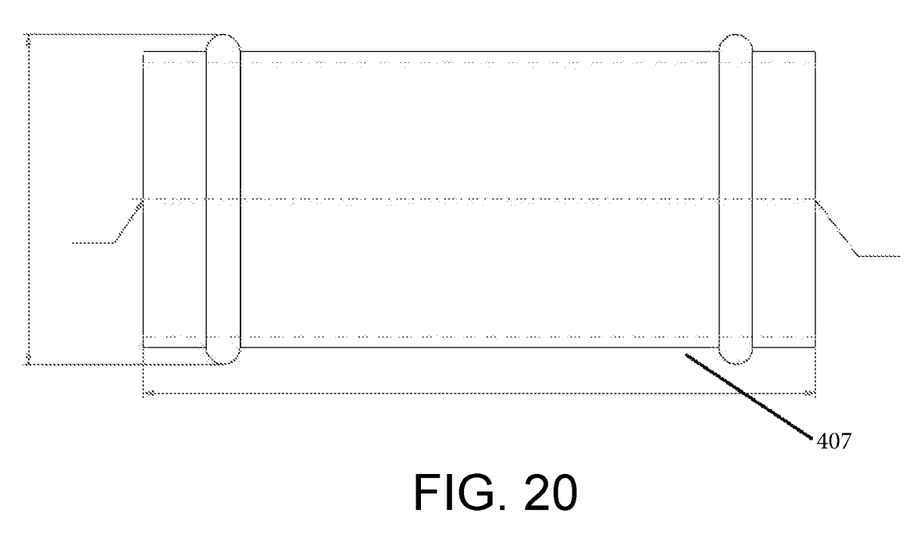
FIG. 20 is a side view of an alternative configuration of element 307 in FIG. 15.

In FIG. 15 is a side sectioned view of the alternative example embodiment of a fluid filtration system 300 comprising a plurality of filtration elements. The system 300 can be configured to direct a flow path 331 into a first filtration element 10. A "flow path," as used herein, refers to any boundary (whether a physical boundary or not) that defines a path that a fluid could pass along. In some embodiments, the flow path 331 comprises a circular cross section with a diameter. In the fluid filtration system 300, the flow path 331 can enter through a first reducer coupler fitting 302 used to increase the diameter of the flow path 331. Fixed to the fitting 302 can be a second reducer coupler fitting 303 used to decrease the diameter of the flow path 331. Fixed to the fitting 303 can be a third reducer coupler fitting 304 used to increase the diameter of the flow path. Fixed on the narrow end of the second reducer coupler fitting 303 and the narrow end of third reducer coupler fitting 304 can be an optional venturi tube 330 used to transition between the couplers and provide increased fluid speed in the direction of the flow path 331.

In some embodiments, an exterior pipe 307 can be fixed between the exterior of the second fitting 303 and the third fitting 304 to provide a smoother outer surface and to increase the structural integrity of the system 300. Fixed to the fitting 304 can be a fourth reducer coupler fitting 305 used to decrease the diameter of the flow path. Fixed to fitting 305 can be an outlet pipe, used to direct the flow of a fluid away from a second filtration element 110.

In fluid filtration system 300, the filtration element 10 is fixed between the couplers 302 and 303. The filtration element 110 is fixed between the couplers 304 and 305. The second filtration element 110 comprises an element 121 within the flow path 331. In some embodiments, the narrow end 123 of the conical element 121 is ideally placed within the narrow portion of the third reducer fitting 304. In some embodiments, the narrow end 123 of the conical element 121 is placed within the venturi in the area within tube 330.

The area of reduced cross-sectional area within tube 330 can generate additional turbulence and/or hydrodynamic cavitation through a venturi effect when the flow path 331 pushes fluid through the area within tube 330. A "reducer coupler," as used herein, refers to any element in a flow path that changes the cross-sectional area of the flow path, whether increasing or decreasing the cross-sectional area. In some embodiments, the diameter of the flow path in an inlet pipe is substantially the same as the diameter of the flow path in an outlet pipe. The pipes and couplers 302, 303, 304, 305, 307 and 330 can comprise one of polyvinyl chloride (PVC), Copper and Stainless Steel.

A prototype version of the fluid filtration system 300 was tested on water and it was discovered that the fluid filtration system 300 is highly effective at removing *E. Coli*, Colilert, MPN from water. Table 2 comprises a compilation of testing data completed on water that cycled through the fluid filtration system 300 zero times (untreated), for 15 minutes and for 60 minutes, showing the effectiveness of the fluid filtration system 300 at removing the tested materials from a fluid.

TABLE 2

Table of water testing completed using prototype versions of filtration elements disclosed herein:

| Cycle Minutes | E. coli, Colilert, MPN (per 100 ml) |
| --- | --- |
| 0 | >2,420 |
| 15 | >2,420 |
| 60 | ND |

Cycle Minutes = Number of minutes the water had passed through the filtration element prior to being tested for the listed contaminants.
ND = Not Detected. If the analyte is present, the concentration is below the detection limit.
*E. coli*, Colilert, MPN Detection Limit = 1 per 100 ml The filtration elements 10, 110 and 210 can comprise copper in some embodiments to increase the effectiveness of the hydrodynamic cavitation. The use of copper in the filter elements 10, 110 and 210 can maximize the amount of fluid-to-copper contact, increasing the effectiveness of the filtration elements 10, 110 and 210 at removing dispersed and/or dissolved materials from a fluid.

In some embodiments, filtration elements 10, 110 and 210 can comprise stainless steel. The term "stainless steel," as used herein, includes all grades of stainless steel along with ferritic and austenitic stainless steels.

In FIGS. 16A to 20 are alternative configurations of elements 302, 303, 304, 305 and 307 in FIG. 15. The alternative configurations in FIGS. 16 to 20 have been identified as elements 402, 403, 404, 405 and 407. The elements 402, 403, 404, 405 and 407 can comprise Copper or another metallic material in some embodiments. Elements 402, 403, 404, 405 and 407 can comprise o-rings on their interior surfaces being held in place by a circumferential depression. The use of o-rings in elements 402, 403, 404, 405 and 407 allows the fluid filtration housing to be assembled quickly using press fittings between the elements. Press fittings are also known as solder-less fittings or compression fittings that can be assembled in a water-tight manner by using mechanical force.

The various fluid filtrations devices disclosed herein can be described as:
1. A device for creating hydrodynamic cavitation in fluids comprising:
   a body; wherein the body comprises a plurality of in-flow openings and a plurality of out-flow openings;
   wherein the in-flow openings are in fluid communication with the out-flow openings.
2. The device of claim 1, wherein the plurality of in-flow openings comprise a cross-sectional area less than a cross-sectional area of the plurality of out-flow openings.
3. The device of claim 2, wherein the in-flow openings comprise a first diameter; the out-flow openings comprise a second diameter; wherein the first diameter is 1 to 3 times the second diameter; and wherein a transition area between the first diameter and second diameter leaves a stepped feature configured to impede the flow of a fluid.
4. The device of claim 3 further comprising a conical element fixed to a front face of the body; wherein the front face is a substantially flat surface facing opposite a direction of fluid flow.
5. The device of claim 4, wherein the conical element comprises stepped features with an angle of about 126 to 144 degrees relative to the direction of fluid flow.
6. The device of claim 4, wherein the conical element comprises stepped features with an angle relative to the direction of fluid flow and wherein the stepped features are configured to induce hydrodynamic cavitation into a fluid.
7. The device of claim 1 fixed in a housing, wherein the housing defines a flow path along its interior surface.
8. The device of claim 7, wherein the housing comprising at least one reducer, wherein the reducer is any element in the flow path that changes a cross-sectional area of the flow path.
9. The device of claim 8 further comprising a plurality of reducers, wherein at least two reducers are configured to generate a venturi effect.
10. The device of claim 9 further comprising a second device for creating hydrodynamic cavitation in fluids comprising: a body comprising a plurality of in-flow openings and a plurality of out-flow openings; wherein the in-flow openings are in fluid communication with the out-flow openings; wherein the plurality of in-flow openings comprise a cross-sectional area less than a cross sectional area of the plurality of out-flow openings; a conical element fixed to a front face of the body; and wherein the front face is a substantially flat surface facing opposite a direction of fluid flow; and wherein the second device for creating hydrodynamic cavitation is fixed to the housing within the flow path.
11. The device of claim 10, wherein the second device for creating hydrodynamic cavitation in fluids is fixed in the housing at a location further down the flow path than the device of claim 1.
12. The device of claim 4, further comprising Copper.
13. The device of claim 8, wherein the housing comprises one of polyvinyl chloride, copper and stainless steel.
14. The device of claim 11, wherein the housing comprises one of polyvinyl chloride, copper and stainless steel.
15. The device of claim 14, wherein the flow path has a first cross-sectional area entering a first reducer and a second cross-sectional area 3 to 5 times the first cross-sectional area; wherein the device of claim 1 is fixed to the housing in the second cross-sectional area; wherein the flow path enters a second reducer with the second cross-sectional area and exits the second reducer with about the first cross-sectional area; wherein the flow path enters a third reducer with the first cross-sectional area and exits the third reducer with the second cross-sectional area; wherein the flow path enters a fourth reducer with the second cross-sectional area and exits the fourth reducer with the first cross-sectional area; and wherein the second device for creating hydrodynamic cavitation is fixed to an inner surface of the fourth reducer in the second cross-sectional area portion.
16. The device of claim 15, wherein the second device for creating hydrodynamic cavitation comprises a conical element fixed to a front face of the body; wherein the front face is a substantially flat surface facing opposite the direction of fluid flow.
17. The device of claim 16, wherein the conical element of the second device for creating hydrodynamic cavitation comprises stepped features with an angle of about 126 to 144 degrees relative to the direction of fluid flow.

18. The device of claim 17, wherein a tip of the conical element of the second device for creating hydrodynamic cavitation is fixed within the flow path within an area within the third reducer comprising the first cross-sectional area.

19. The device of claim 17, wherein a tip of the conical element of the second device for creating hydrodynamic cavitation is fixed within an area of the flow path comprising a change in cross-sectional area configured to generate a venturi.

20. The device of claim 19, wherein the reducer elements are configured to be assembled via press fittings between the reducer elements.

What has been described are filtration elements and a system configured to remove dispersed and/or dissolved materials from a fluid. In this disclosure, there are shown and described only the preferred embodiments, but, as aforementioned, it is to be understood that the invention is capable of use in various other combinations and environments and is capable of changes or modifications within the scope of the inventive concept as expressed herein.

What is claimed is:

1. A device for creating hydrodynamic cavitation in a fluid comprising:
   a first element for creating hydrodynamic cavitation in the fluid comprising:
   a cylindrical body with an axial center; wherein the body comprises a plurality of drilled in-flow openings located on a first planar end of the cylindrical body and a plurality of drilled out-flow openings located on another planar end of the cylindrical body;
   wherein an axial center of the in-flow openings and an axial center of the out-flow openings are parallel to the axial center of the cylindrical body;
   wherein the in-flow openings are in fluid communication with the out-flow openings through respective transition areas;
   wherein the plurality of out-flow openings comprise a cross-sectional area less than a cross-sectional area of the plurality of in-flow openings; and
   wherein the in-flow openings comprise a first diameter; the out-flow openings comprise a smaller second diameter; and,
   wherein the transition areas taper from the first diameter to the second diameter and are configured to impede the flow of a fluid.

2. The device of claim 1, wherein the first element is fixed in a housing, wherein the housing defines a flow path along its interior surface.

3. The device of claim 2, wherein the housing comprises at least one reducer, wherein the reducer is any element in the flow path that changes a cross-sectional area of the flow path.

4. The device of claim 3, further comprising a second element for creating hydrodynamic cavitation in the fluid comprising:
   a cylindrical body with an axial center; wherein the body comprises a plurality of drilled in-flow openings located on a first planar end of the cylindrical body and a plurality of drilled out-flow openings located on another planar end of the cylindrical body;
   wherein an axial center of the in-flow openings and an axial center of the out-flow openings are parallel to the axial center of the cylindrical body;
   wherein the in-flow openings are in fluid communication with the out-flow openings through respective transition areas;
   wherein the plurality of out-flow openings comprise a cross-sectional area less than a cross-sectional area of the plurality of in-flow openings; and wherein the in-flow openings comprise a first diameter;
   the out-flow openings comprise a smaller second diameter; and
   wherein the transition areas taper from the first diameter to the second diameter and are configured to impede the flow of a fluid; and
   wherein the second element is fixed to the housing within the flow path.

5. The device of claim 4, wherein the second element for creating hydrodynamic cavitation the fluid is fixed in the housing at a location further down the flow path than the first element.

6. The device of claim 5, wherein the housing comprises one of polyvinyl chloride, copper and stainless steel.

7. The device of claim 3, wherein the housing comprises one of polyvinyl chloride, copper and stainless steel.

8. The device of claim 1, the first element further comprising copper.

9. A device for creating hydrodynamic cavitation in a fluid, comprising:
   an element comprising:
   a cylindrical body with an axial center, wherein the body comprises a plurality of drilled in-flow openings located on a first planar end of the cylindrical body and a plurality of drilled out-flow openings located on another planar end of the cylindrical body;
   wherein an axial center of the in-flow openings and an axial center of the out-flow openings are parallel to the axial center of the cylindrical body:
   wherein the in-flow openings are in fluid communication with the out-flow openings through respective transition areas;
   wherein the plurality of out-flow openings comprise a cross-sectional area less than a cross-sectional area of the plurality of in-flow openings:
   wherein the in-flow openings comprise a first diameter;
   wherein the out-flow openings comprise a smaller second diameter;
   wherein the transition areas taper from the first diameter to the second diameter and are configured to impede the flow of a fluid;
   further comprising a conical element fixed to the first planar end with an apex of the cone facing opposite a direction of fluid flow; and
   wherein the first planar end being a flat surface facing opposite the direction of fluid flow.

10. The device of claim 9, wherein the conical element comprises stepped features with an angle of about 126 to 144 degrees relative to the direction of fluid flow.

11. The device of claim 9, wherein the conical element comprises stepped features with an angle relative to the direction of fluid flow and wherein the stepped features are configured to induce hydrodynamic cavitation into the fluid.

12. The device of claim 6, wherein the at least one reducer comprises first, second, third and fourth reducers;
    wherein the flow path has a first cross-sectional area entering the first reducer and a second cross-sectional area 3 to 5 times the first cross-sectional area exiting the first reducer;
    wherein the first element is fixed to the housing in the second cross-sectional area;

wherein the flow path enters the second reducer with the second cross-sectional area and exits the second reducer with about the first cross-sectional area;

wherein the flow path enters the third reducer with the first cross-sectional area and exits the third reducer with the second cross-sectional area;

wherein the flow path enters the fourth reducer with the second cross-sectional area and exits the fourth reducer with the first cross-sectional area; and wherein the second element is fixed to an inner surface of the fourth reducer in a second cross-sectional area portion.

13. The device of claim 12, wherein the second element for creating hydrodynamic cavitation comprises a conical element fixed to a front face of the body; wherein the first planar end is a substantially flat surface facing opposite the direction of fluid flow.

14. The device of claim 13, wherein the conical element of the second element comprises stepped features with an angle of about 126 to 144 degrees relative to the direction of fluid flow.

15. The device of claim 14, wherein a tip of the conical element of the second element is fixed within the flow path within an area within the third reducer comprising the first cross-sectional area.

16. The device of claim 15, wherein the reducers are configured to be assembled via press fittings between the reducers.

* * * * *